United States Patent [19]
Roesner

[11] 3,978,924
[45] Sept. 7, 1976

[54] HIDDEN BOW SPRING FOR CALIPERS AND CENTRALIZERS

[75] Inventor: Raymond E. Roesner, Houston, Tex.

[73] Assignee: Dresser Industries, Inc., Dallas, Tex.

[22] Filed: Oct. 28, 1975

[21] Appl. No.: 626,606

[52] U.S. Cl. .............................. 166/241; 33/178 F
[51] Int. Cl.² ...................... E21B 17/10; G01B 5/12
[58] Field of Search............ 166/241, 250, 253–255,
166/64, 113, 166, 173, 138, 226; 308/4 A;
33/178 F

[56] References Cited
UNITED STATES PATENTS

| | | | |
|---|---|---|---|
| 1,898,074 | 2/1933 | Bailey ......................... | 166/241 UX |
| 2,174,085 | 9/1939 | Hartman ...................... | 166/241 |
| 2,656,890 | 10/1953 | Brandon ...................... | 166/241 |
| 2,695,820 | 11/1954 | Segesman ..................... | 166/241 |
| 2,899,633 | 8/1959 | Smith et al. ................... | 166/241 X |
| 3,282,349 | 11/1966 | Cobbs et al. ................... | 166/241 |
| 3,685,158 | 8/1972 | Planche ........................ | 33/178 F |

*Primary Examiner*—Stephen J. Novosad
*Attorney, Agent, or Firm*—William E. Johnson, Jr.

[57] ABSTRACT

An earth borehole instrument having a plurality of pad members adapted to engage the borehole walls are pivotally connected through mechanical arms to a spring-loaded slidable collar on the instrument. Each of the pad assemblies has a bow spring on its inner surface which is fixedly attached to one of the mechanical arms and slidably attached to another of the mechanical arms supporting the pad. The hidden bow spring maintains the pad, serving as a wear link, in flat contact with the borehole wall. In alternative embodiments, hidden bow springs maintain one or more borehole wall-engaging wheels against the borehole wall.

6 Claims, 5 Drawing Figures

HIDDEN BOW SPRING FOR CALIPERS AND CENTRALIZERS

BACKGROUND OF THE INVENTION.

This invention relates generally to earth borehole apparatus, and specifically to caliper and centralizing apparatus having borehole wall-engaging faces urged against the borehole wall.

It is well known in the art of well logging to use caliper and centralizing instruments having a plurality of borehole wall-engaging members and having means, for example, a spring, to urge the borehole wall-engaging members against the borehole wall. For example, as discussed hereinafter with regard to the prior art, it has been known to use a bow spring interconnected between two rigid arms to contact the borehole walls. With such instruments, the bow spring generally has to have a large radius and the rigid arms have to be maintained at a low angle of approximately no greater than 20° to 25° to keep the connecting bow spring from overstressing the spring material. With such devices, there is generally a great distance between the pivot points on the rigid arms.

It is therefore a primary object of the present invention to provide a new and improved well bore instrument having means to centralize the instrument within the borehole;

It is also an object of the object invention to provide a new and improved well bore apparatus having means to caliper the earth borehole.

The objects of the present invention are accomplished, generally, by apparatus which includes an elongated support member adapted for movement through an earth borehole, at least one borehole-engaging member constructed to move along the wall of the borehole, means for coupling said at least one borehole-engaging member to said support member and adapted to urge said borehole-engaging member against the wall of the borehole and a bow spring attached to the coupling means and adapted to maintain the borehole-engaging member in contact with the borehole wall.

These and other objects, features and advantages of the present invention will be more readily appreciated from a reading of the following detailed specification and drawing, in which.

Figure 1:
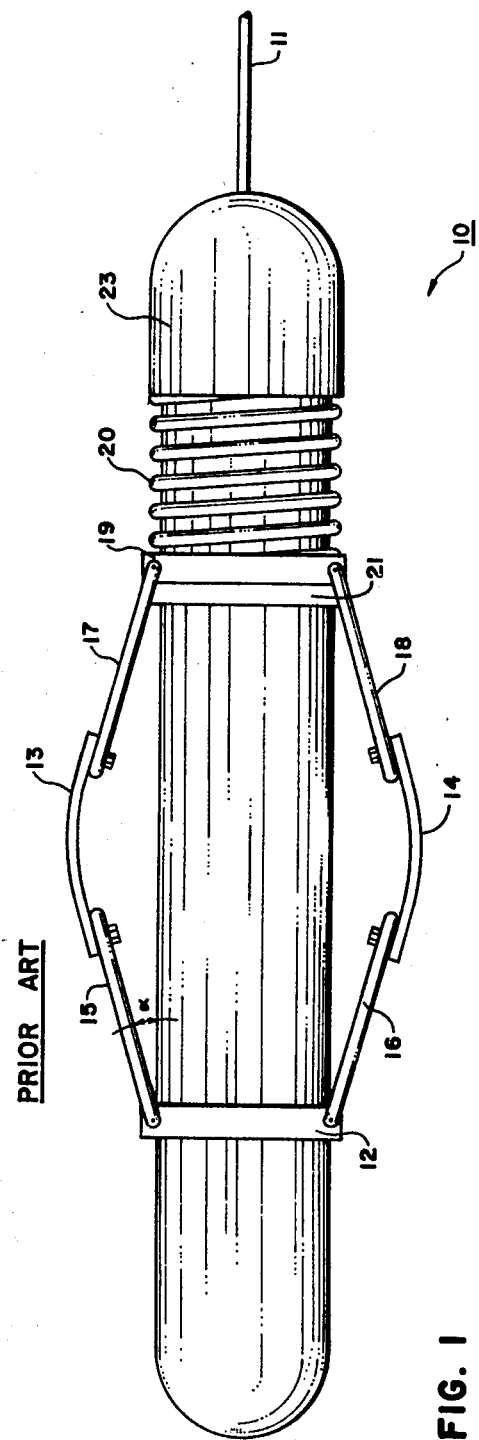
FIG. 1 is an elevated view of an earth borehole apparatus which is known in the prior art as being useful for centralizing earth borehole instruments.

Referring now to the drawing in more detail, especially to FIG. 1, a prior art centralizing instrument 10 is illustrated wherein the instrument 10 is adapted to transverse an earth borehole (not illustrated) by means of a hoisting cable 11 which would normally be connected to a hoisting unit at the earth's surface in a manner well known and conventional in the art. The instrument 10, sometimes referred to herein as an elongated support member, is generally cylindrical in shape and sized to pass through the earth boreholes of interest. A stationary collar 12 is attached to the support member 10. A plurality of borehole-engaging bow springs 13 and 14 are rigidly attached, respectively, to arm members 15 and 16 which in turn are each pivotally connected to the stationary collar 12. A second pair of rigid arm members 17 and 18 are rigidly connected at their first ends to the bow spring members 13 and 14, respectively, and are pivotally connected at their other ends to a slidable collar 19 which is spring loaded by means of the spring 20 against a stationary collar 21 which is affixed to the main housing of the instrument 10. Although not illustrated, a transducer rod can be attached to the slidable collar 19 and be adapted to be movable within the upper portion 23 of the main instrument housing 10. It should be appreciated, of course, that such a transducer assembly would be used when calipering an earth borehole and that no such transducer is necessary when the instrument is used for centralizing purposes only.

As illustrated in FIG. 1, the arms 15 and 16 make an angle $\alpha$ with the main instrument housing. With such a prior art device, the angle $\alpha$ has to be maintained at a low angle, preferably no greater than 20° to 25°, to keep the connecting bow springs 13 and 14 from overstressing the spring material. Consequently, because of the low angle and the need to have the bow springs touch the borehole wall, a considerable distance is needed between the collars 12 and 19, thus resulting in a rather long instrument. Furthermore, such prior art instruments have the disadvantage of uneven wearing on the bow springs 13 and 14 while traversing an earth borehole.

In the operation of the prior art apparatus constructed in accordance with FIG. 1, as the instrument 10 traverses an earth borehole having varying diameters therein, the spring 20 forces the bow springs 13 and 14 against the borehole wall and thus maintains the main instrument housing centralized within the borehole. Although not illustrated, the instrument 10 would normally contain various well logging instruments and-/or completion equipment well known in the well logging art.

Figure 2:
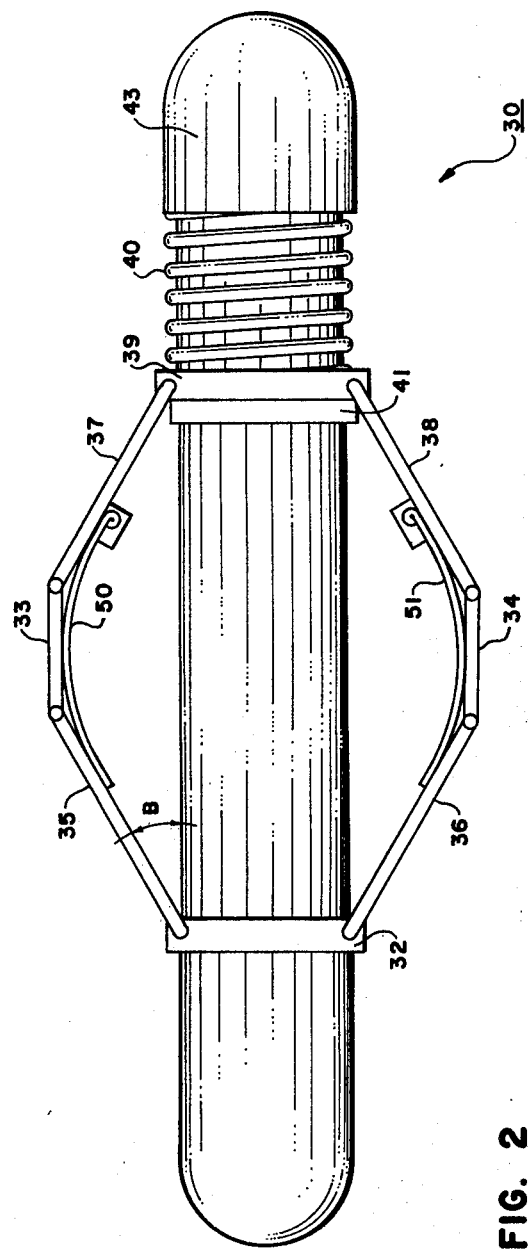
FIG. 2 is an elevated view of an earh borehold centralizing apparatus in accordance with the present invention.

Referring now to FIG. 2, there is illustrated an instrument 30 constructed in accordance with the present invention which is adapted to likewise traverse in earth borehole (not illustrated) by means of a cable such as that illustrated in FIG. 1 which would likewise be connected to a hoisting unit at the earth's surface in a manner well known and conventional in the art. The elongated support member 30 is generally cylindrical in shape and sized to pass through the earth boreholes of interest. A stationary collar is attached to the support member 30. A pair of borehole-engaging wear links 33 and 34 are pivotally attached, respectively, to arm members 35 and 36 which in turn are each pivotally connected to the stationary collar 32. A second pair of arm membes 37 and 38 are pivotally connected at their first ends to the wear links 33 and 34, respectively, and are connected at their other ends to a slidable collar 39 which is spring loaded by means of the spring 40 against a stationary collar 41 which is affixed to the main housing of the support member 30. Although not illustrated, as was discussed with respect to the prior art device of FIG. 1, a transducer rod can be connected to the slidable collar 39 and be adapted to be movable within the upper portion 43 of the support member 30. A pair of "hidden" bow springs, identified generally by the numerals 50 and 51, are connected to the undersides of the two wear link assemblies, all of which is illustrated in greater detail in FIG. 3.

Figure 3:
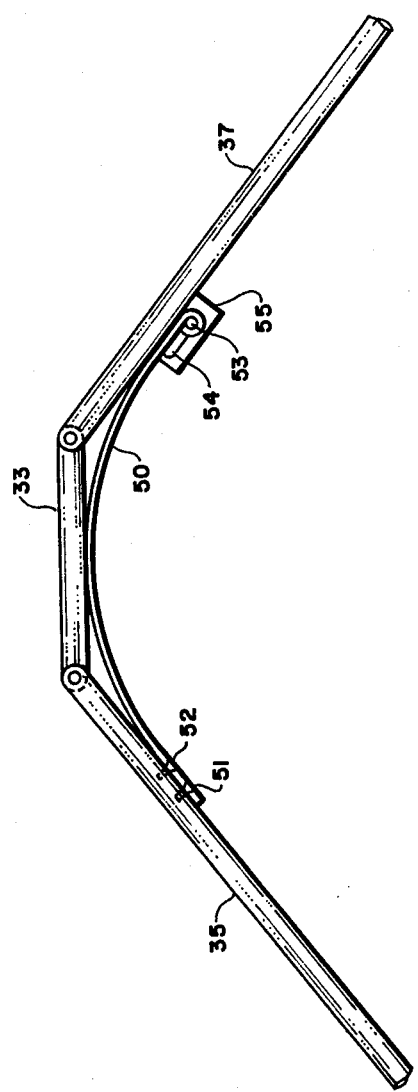
FIG. 3 is an enlarged view of one of the pad assemblies illustrated in FIG. 2 in accordance with the present invention.

Referring now to FIG. 3, the wear link assembly including the wear link 33 is illustrated in greater detail. It should be appreciated, of course, that the other wear link assembly, containing the wear link 34, is identical to that of the wear link assembly which is illustrated in FIG. 3. A bow spring 50 is rigidly attached to the underside of the rigid arm 35 by means of rivets or other such conventional devices 51 and 52. The bow spring 50 is thus urged against the underside of the wear link 33. The other end of the bow spring 50 has a pin 53 adapted to slide in a groove 54 in a housing 55 which is fixedly attached to the underside of the rigid arm 37. Thus, as the diameter of the borehole changes, the pin 53 slides back and forth within the slot 54 while urging the wear link 33 to remain substantially flat against the borehole wall.

In the operation of the instrument constructed in accordance with FIG.'s 2 and 3, it should be appreciated that the sliding feature of the pin 53 in slot 54 helps to transmit force to the underside of the wear link 33 and also allows the arms 35 and 37 to collapse down to the body of the support member 30 if desired.

In comparing the prior art apparatus of FIG. 1 with the apparatus of FIG. 2 built in accordance with the present invention, it should be understood that when the bow spring is on the exterior of the rigid mechanical arms, as in the prior art, such a spring has to function both as a strength member and as a spring. However, by having the bow spring "hidden" on the underside of the wear link 33, the angle $\beta$ between the mechanical arm 35 and the support member 30 can be a greater angle, for example, 30° to 35°, which allows the overall apparatus to have a smaller length dimension. Furthermore, when using the hidden bow spring of the present invention, the spring does not have to act as a strength member.

Figure 4:
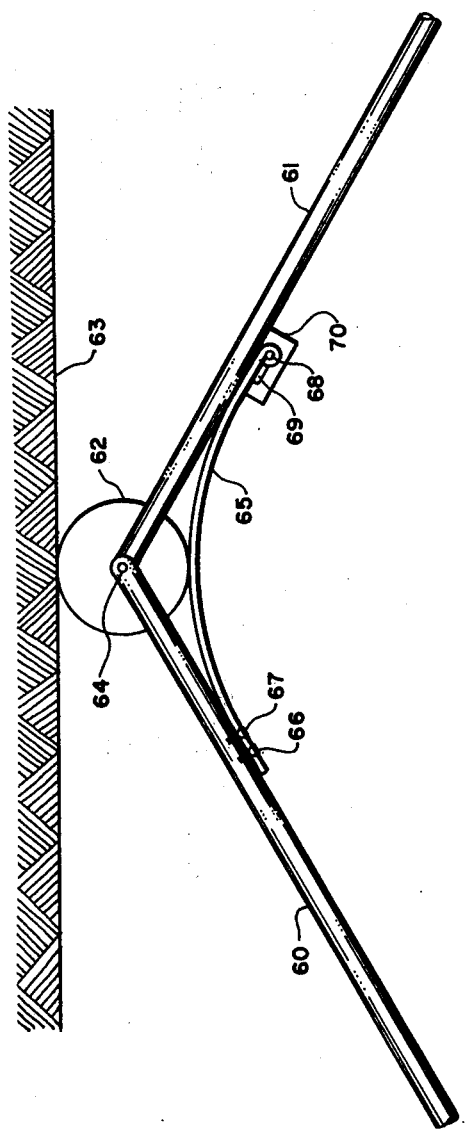
FIG. 4 is an enlarged view of a single borehole-engaging assembly according to an alternative embodiment of the invention.

Referring now to FIG. 4, an alternative embodiment of the present invention is illustrated wherein a pair of rigid arm members 60 and 61 are pivotally attached to a circular disk 62 at a pivot point 64. While the preferred embodiment contemplates that the circular disk 62 is a rolling wheel, the disk 62 can, if desired, be constructed to slide along the borehole wall 63. A bow spring 65 is attached to the underside of the rigid arm 60 by rivets or other suitable attachment means 66 and 67 while the other end of the spring 65 has a pin 68 which slides in a groove 69 within a housing 70 rigidly attached to the underside of the rigid arm 61. Although not illustrated, it should be appreciated that the rigid arm 60 has its other end pivotally attached to a fixed collar, for example, the collar 32 in FIG. 2 whereas the rigid arm 61 has its other end pivotally attached to a sliding collar, for example, the collar 39 of FIG. 2. Furthermore, although not illustrated, a complete instrument build in accordance with the apparatus illustrated in FIG. 4 can have as many of the assemblies illustrated in FIG. 4 as desired, for example, one or more such assemblies.

The operation of the apparatus built in accordance with FIG. 4 is much like that of the operation of the apparatus in accordance with FIG.'s 2 and 3 in that a main spring on the support member working against the sliding collar tends to maintain the wheel 62 against the borehole wall 63 and the spring 65 works in conjunction with such a main spring (not illustrated) to maintain the wheel 62 in good contact with the borehole wall 63.

Figure 5:
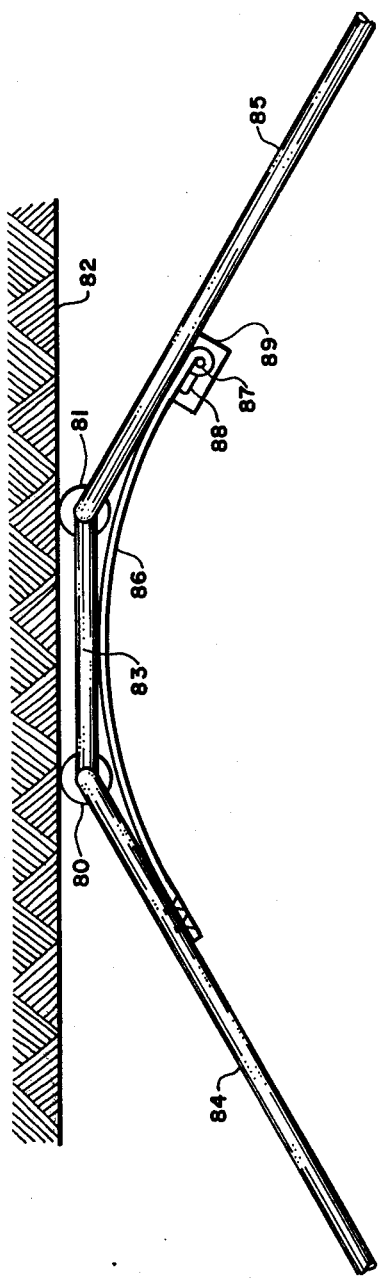
FIG. 5 is an enlarged view of a single borehole-engaging assembly according to another alternative embodiment of the invention.

Referring now to FIG. 5, an alternative embodiment of the invention is illustrated wherein the borehole-engaging assembly includes a pair of wheels 80 and 81 which are maintained against the face 82 of the borehole wall. The wheels 80 and 81 are joined by a bridge member 83. A first rigid arm member 84 is pivotally attached to the wheel 80 and a second rigid arm member 85 is pivotally attached to the wheel 81. As with the other embodiments, the rigid arm member 84 is pivotally attached to a stationary collar (not illustrated) on the elongated support member and the rigid arm member 85 is pivotally attached at its other end to a sliding spring-loaded collar (not illustrated) on the elongated support member. A bow spring 86 is rigidly attached to the rigid arm member 84 and its other end, by means of pin 87 which slides in a groove 88 in a housing 89 which is rigidly attached to the arm member 85, is slidingly attached to the arm member 85. The bow spring 86 pushes against the underside of the bridge member 83.

In the operation of the apparatus of FIG. 5, as the instrument traverses an earth borehole, and as the diameter of the borehole changes, the bow spring 86 pushes up against the bridge member 83 which in turn maintains the wheels or disks 80 and 81 firmly against the face 82 of the borehole wall.

Thus it should be appreciated that there have been illustrated and described herein the preferred embodiments of apparatus which find utility as either centralizing tools or as calipering instruments in accordance with the present invention. However, those skilled in the art will recognize that obvious modifications can be made to the preferred embodiments without departing from the spirit of the invention. For example, while one of the illustrated embodiments shows a pair of wear link assemblies, those skilled in the art will recognize that such instruments generally contain three or four such assemblies to better maintain the instrument centralized in the borehole. Furthermore, those skilled in the art will recognize that even though the preferred embodiments contemplates the bow spring being rigidly attached to the first arm member which is pivotally attached to the fixed collar and the other end of the bow spring being slidably attached to the second arm member which is pivotally attached to a sliding collar, quite obviously, the bow spring can be fixedly attached to the second arm member and slidably attached to the first arm member.

The embodiments of the invention in which an exclusive property or privilege is claimed are defined as follows:

1. An apparatus for traversing an earth borehole, comprising:
   an elongated support member adapted for movement through an earth borehole;
   a borehole-engaging member having first and second ends and being constructed to move along the wall of the borehole;
   a first arm member connected between said first end of said borehole-engaging member and a fixed pivot point on said support member;

a second arm member connected between said second end of said borehole-engaging member and a slidable pivot point on said support member; and a bow spring having first and second ends, one of said spring ends being fixedly attached to the underside of one of said arm members and the other of said spring ends being slidably attached to the other of said arm members, said bow spring being positioned to push against the underside of said borehole-engaging member.

2. The apparatus according to claim 1, including in addition thereto, spring means acting in conjunction with said sliding pivot point to extend said second arm member.

3. The apparatus according to claim 1, wherein said borehole-engaging member comprises a pair of wheels joined by a bridge member, the point of connection between said first arm and said borehole-engaging member being coincident with the axis of the first of said wheels and the point of connection between said second arm and said borehole-engaging member being coincident with the axis of the second of said wheels.

4. The apparatus according to claim 3, wherein said first ends of said bow springs are fixedly attached, respectively, to said first arm members, and said second ends of said bow springs are slidably attached, respectively, to said second arm members.

5. An apparatus for traversing an earth borehole, comprising:

an elongated support member adapted for movement through an earth borehole;

a plurality of borehole-engaging members, each having first and second ends and being constructed to move along the wall of the borehole;

a plurality of first arm members connected, respectively, between the first ends of said borehole-engaging members and a plurality of fixed pivot points on said support member;

a plurality of second arm members connected, respectively, between the second ends of said borehole-engaging members and a plurality of slidable pivot points on said support member;

a plurality of bow springs, each having first and second ends, the first ends of said springs being attached to the undersides of said first arm members, respectively, and the second ends of said springs being attached, respectively, to the undersides of said second arm members, said bow springs being positioned to push, respectively, against the undersides of said borehole-engaging members.

6. An apparatus for traversing an earth borehole, comprising:

an elongated support member adapted for movement through an earth borehole;

a borehole-engaging member constructed to move along the wall of the borehole;

a first arm member connected between said borehole-engaging member and a fixed pivot point on said support member;

a second arm member connected between said borehole-engaging member and a slidable pivot point on said support member; and a bow spring having first and second ends, one of said spring ends being fixedly attached to the underside of one of said arm members and the other of said spring ends being slidably attached to the other of said arm members, said bow spring being positioned to push against the underside of said borehole-engaging member.

* * * * *